June 6, 1939.  L. P. F. VAN DER GRINTEN  2,161,644
METHOD AND MEANS FOR MEASURING RADIANT ENERGY
Filed Nov. 6, 1936  2 Sheets-Sheet 1
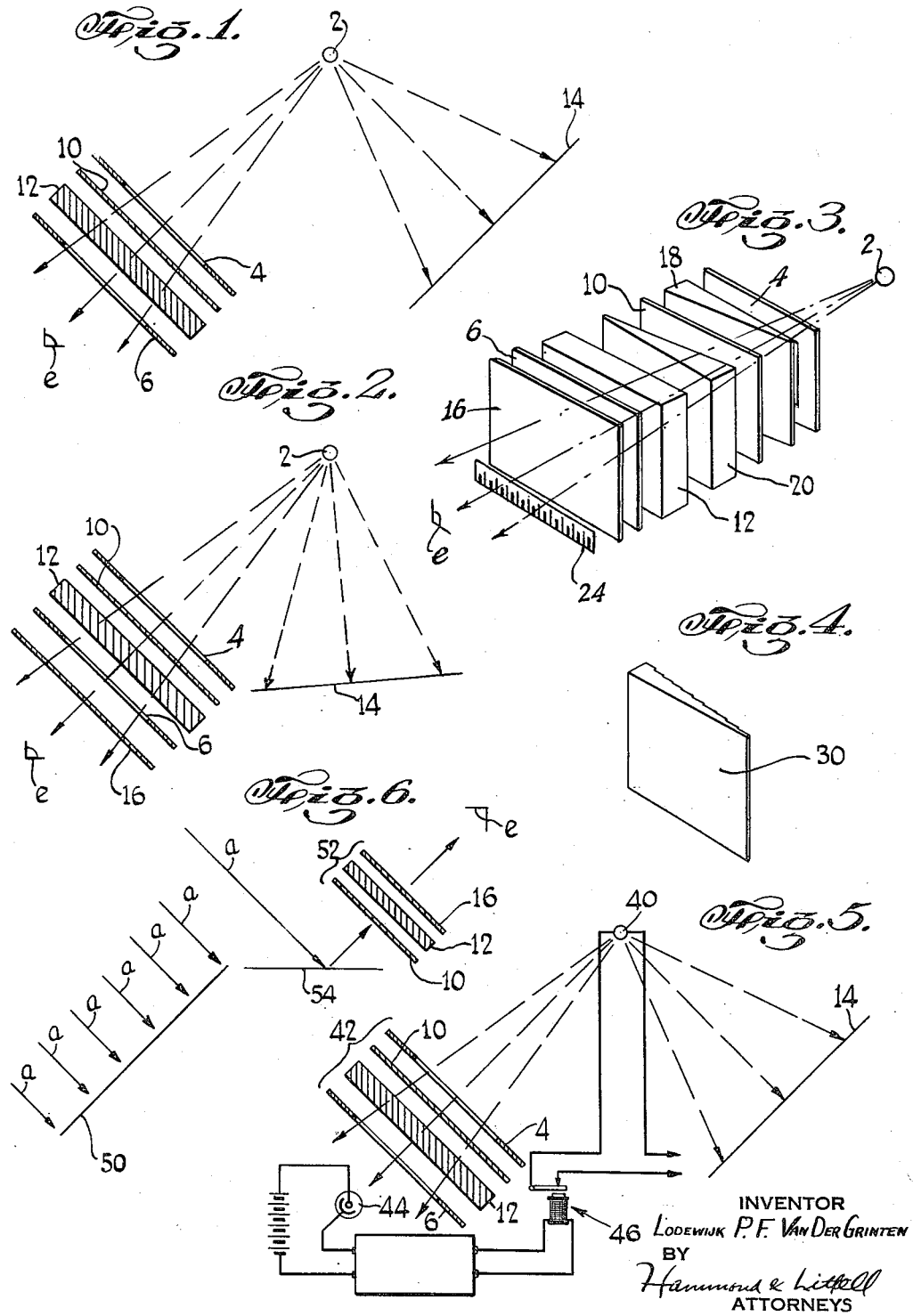
INVENTOR
Lodewijk P. F. Van Der Grinten
BY
Hammond & Littell
ATTORNEYS

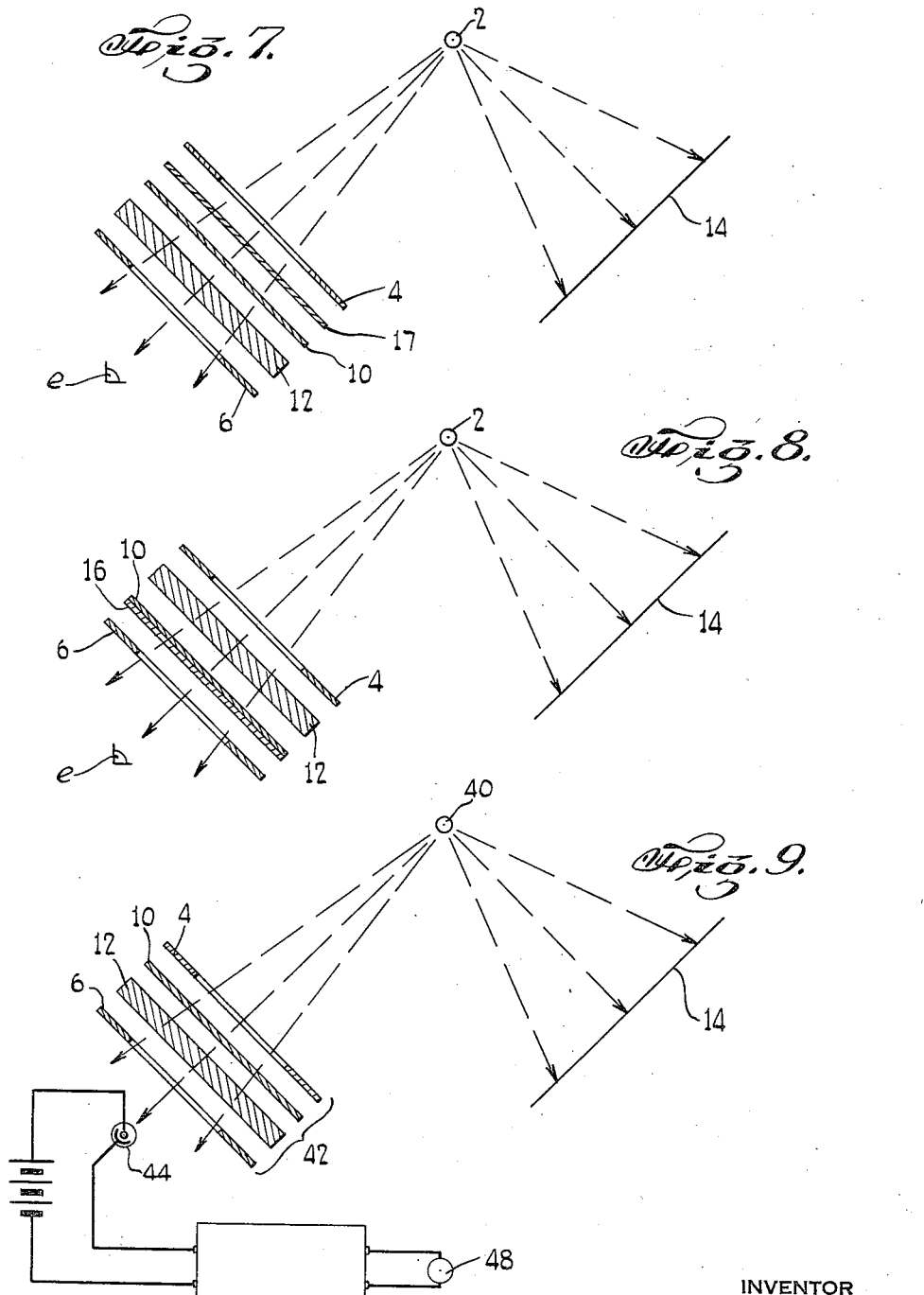

Patented June 6, 1939

2,161,644

UNITED STATES PATENT OFFICE 2,161,644

METHOD AND MEANS FOR MEASURING RADIANT ENERGY

Lodewijk Pieter Frans van der Grinten, Venlo, Netherlands, assignor to Naamlooze Vennootschap Chemische Fabriek L. van der Grinten, Venlo, Netherlands, a limited-liability company of the Netherlands Application November 6, 1936, Serial No. 109,405 In the Netherlands April 9, 1936

19 Claims. (Cl. 250—83)

This invention relates to methods and means for measuring radiant energy, and it has particular reference to the accurate control of light radiations as used in photoprinting, light therapy, the irradiation of foodstuffs, bleaching processes and other processes or treatments in which it is important to subject an object to precise quantities of light.

In many applications of light radiations it is difficult to obtain uniform results when the treatments are carried out according to methods heretofore known because of variations in the amount of light received by the object from the light source. This problem more particularly occurs when arc lamp or solar radiations are employed, since the intensity of radiations from these sources is subject to continual unpredictable variations.

It is an object of this invention to provide methods and means for indicating the amount of radiations received from a light source so that accurate control over treatments and processes utilizing the light from such source may be maintained.

A further object of the invention is to enable such control without consideration of the intensity or duration of the irradiation.

Another object of the invention is to provide means whereby the amount of light received from a light source may be determined by visual observation independently of variations in the intensity of the light transmitted or radiated from the source.

Another object is to provide means enabling similar control over radiations which are normally imperceptible to the human eye.

Still another object of my invention is to provide means for subjecting an object to radiations from a light source, which means may be arranged so that the exposure of the object to such radiations is terminated automatically after the object has been exposed to a fixed quantity of radiation. Other objects and advantages of my invention will become apparent from the ensuing description thereof.

A common procedure for measuring the quantity of radiation received from a light source is to determine the intensity of the light received from the source and then regulate the time of exposure to secure an approximation of the desired dose. The accuracy of this procedure depends upon accurate determinations of intensity and requires that the intensity remain constant. Another known procedure involves the use of compounds which exhibit a blackening effect when exposed to light, the quantity of radiation received being estimated in accordance with the degree of blackening acquired by such compounds. In practice a satisfactory result can be obtained with this method only when the source of radiation is fairly constant.

I have discovered that light-sensitive diazo compounds and layers or solutions containing said compounds may be utilized to measure doses of light radiation successfully. By the term "diazo compounds" quite generally compounds having a diazo group are meant, consequently for example also the diazo sulphonic acids, diazo sulphonates and the like.

To this effect a layer, solution or the like which contains a diazo compound with a marked capacity for absorbing radiations of certain wave lengths is subjected to radiations from the light source simultaneously with the exposure of the object and the moment is ascertained when the said layer, solution or the like after having absorbed a certain amount of radiation so to say suddenly loses its marked absorption capacity for the said certain rays after practically having kept it till the end of the decomposition. This phenomenon is akin to a piercing of or "breaking through" the layer by the particular radiations which it formerly absorbed markedly. A given quantity of the diazo compounds which exhibit this phenomenon requires a definite amount of radiation before the breaking through point is reached, and the moment when this point is reached may be rather sharply ascertained by means of the same particular rays, hereinafter referred to as the "breaking through rays." Other radiations, in as far as they would interfere with a good ascertainment, may be filtered out wholly or in a substantial degree by the use of light filtering means.

The time of exposure of the object and variations in the intensity of the radiation have no effect on the precision of measurement, since a given quantity of radiation is required to cause the piercing or breaking through.

Thus the amount of radiant energy—and this is a particular advantage of my invention—may be measured directly without consideration of the intensity or duration of the irradiation. The amount of the radiation is defined by the points of beginning of the exposure and of beginning of the transmission of the breaking through rays.

According to the invention the ascertainment of the breaking through point may take place directly by the human eye or in an other way, for example in an electric, preferably photo-electric way. In the latter case the ascertainment of the breaking through point advantageously may be combined with an automatic switching device which serves to switch off the source of irradiation.

The breaking through rays of many diazo compounds have wave lengths lying in the ultra-violet part of the spectrum. In these cases a direct observation with the human eye is impossible without auxiliary expedients.

According to a particularly useful and practical embodiment of my invention, however, in these cases also the ascertainment of the breaking through point may be effected directly with the human eye by interposing in the path of the radiation, between the system comprising the diazo compound and an optical filter—if any—on one hand, and the observer on the other hand, a screen which renders rays of short wave length visible, e. g. by being provided with a fluorescent or phosphorescent substance. At the moment that the ultra-violet breaking through rays break through, the fluorescent or phosphorescent substance begins to emit a powerful visible light.

Since according to the invention, as far as it has been described above, the radiation transmitted is not continuously ascertained and only the breaking through point is ascertained, it is of importance to establish an accurate correlation between the action of the radiation on the object to be irradiated, e. g. on the copy to be made, and on the diazo layer. This may be effected in a simple manner by the choice of the diazo compound, by varying its quantity, and particularly by adjusting the position of the measuring means with respect to the source of radiation, or by a suitable light absorbing screen between said means and the source, such in connection with the location of the said source in relation to the object to be irradiated.

These and other embodiments of my invention will become more apparent in the light of the following description taken in connection with the figures of the drawings, in which Figures 1 to 9 inclusive are diagrammatic showings of various illustrative arrangements of means for practicing the invention.

Figure 1 diagrammatically illustrates a system including means enabling visual observation of the point at which a predetermined amount of radiation has been received from a light source. In the path of radiations from a source 2, I interpose two spaced metal plates or other light blocking means 4, 6, each having an opening to permit the passage of radiations from the source to the eye e of an observer. Behind the first plate is positioned an indicating means 10, provided with a diazo compound having the capacity of markedly absorbing certain radiations from the source and of thereafter suddenly transmitting such radiations. Between this member and the second plate are located one or more light filtering means 12 substantially transmitting the breaking through rays only, consequently the rays which are strongly absorbed by the diazo compound used.

According to the arrangement of Figure 1, an observer may stand in a position such that the indicating means lies between his eyes and the light source, while radiations from the source are transmitted both to the diazo compound at 10 and to the object 14, the irradiation of which must be dosed. After simultaneous exposure of the indicating means and the object for a certain period of time, the breaking through rays, which were substantially wholly absorbed by the diazo compound during such period, suddenly break through the compound and become visible to the observer, whereupon the observer may terminate the exposure of the object.

It is obvious that for a given position of the object with respect to the light source different amounts of radiations may be measured by the indicating arrangement merely by changing its distance to the source. By locating the indicating means at a greater distance from the source the breaking through moment occurs only after the object 14 has received a greater amount of radiation. The contrary will be the case when the said distance is diminished. As a matter of fact enlarging of the dose of radiation received by the object may also be accomplished by increasing the amount of diazo compound at 10, or by placing between the means 10 and the light source a light absorbing means, for example one or more frosted glass screens 17 (Fig. 7), and so on. In this explanation it is assumed, of course, that the distance between the source 2 and the object 14 remains the same. It is further apparent that the light filtering member 12 may be placed either between the indicating means 10 and the observer or between said means and the light source (Figure 8), the latter position of member 12 having a special advantage under certain conditions, which will be described later on.

Figure 2 represents an arrangement similar to that shown in Figure 1, a screen or other element 16 provided with a fluorescent or phosphorescent substance being positioned between the diazo compound at 10 and the observer. This arrangement is specially adapted to be used when the breaking through rays have short wave lengths. Though in Figure 2 the element 16 is represented as standing outside the metal plates 4, 6 it is to be understood that it may be located inside (see Figure 8).

In Figure 3, I illustrate a particularly useful arrangement which may replace members 10 and 12 of Figure 2. A graduated light absorption member 18 is placed between the indicating means 10 and the light source 2, and another graduated light absorption member 20, similarly graduated, is disposed oppositely on the other side of the indicating means.

When means 10 is removed, member 16 will show fluorescence, the intensity of the fluorescence being the same from the left to the right as both graduated light absorption members 18 and 20 together are of a uniform optical density. When means 10 is restored to its original position and irradiation from source 2 is started, fluorescence will be first observed on the right end of member 16 after means 10 has absorbed a certain amount of radiation, as the breaking through rays because of the graduated light absorption member 18 first break through at the right end. When irradiation is continued a fluorescent area is observed which extends progressively over member 16 from its right to its left end.

Due to this arrangement an observer may now dose an unlimited number of amounts of radiation between the right and the left end of member 16. If a small amount is required the irradiation should be terminated when only a part of the right half of the said member glows; the more the boundary between the fluorescent and non-fluorescent areas of member 16 progresses to its left end, the greater the amount of radiation measured; so within a certain range a length parameter is obtained for dosing radiant energy.

When using this arrangement also the adjustment described above with reference to Figure 1, such as by varying the distance between source 2 and means 10, is exceedingly easy; with a considerable range of the graduated light absorption member the amount of radiation may be varied readily within very wide limits without altering the location of source 2 with respect to means 10. For great variations in the amounts to be measured the aids and appliances as described with respect to Figure 1 will be used also.

The same results as those obtained by the arrangement of Figure 3 may be secured without using separate graduated light absorption members, consequently by an arrangement analogous to that of Figure 2, viz. by graduating the amount of the diazo compound in the indicating means 10. This means that the indicating means contains, for example, at its right end only a small amount of a diazo compound and that this amount gradually increases from the right to the left end. An indicating means as meant here may be obtained, for example, by previously exposing a uniformly prepared member under a graduated light absorption member.

Where the word "graduated light absorption member" is used, such members in the broadest sense of the word are meant. Suitable members may have a steplike structure as represented in Figure 4 or may be graduated in any other way, at least be different from a wedge in the narrow sense. So I do not at all limit myself to the use of a wedge in its narrow meaning. As a matter of fact the same holds good for the distribution of the sensitive substance over means 10.

As an additional feature of the arrangement of Figure 3 or its equivalents a scale 24 is provided in the field of observation; the course of the progressing observation—the length parameter—may be related to this scale.

Figure 5 relates to an arrangement embodying an important improvement by enabling an automatic control of the irradiation. 40 is a source of artificial light, 42 represents an arrangement similar to that of Figure 1, 44 is a photo-electric cell or other light sensitive means and 46 includes a relay, amplifier and electrical circuit connecting said light sensitive means with the light source. Upon transmission of the breaking through rays from the source by the diazo compound at 10, the photo-electric cell 44 establishes a circuit in the relay and this in turn causes the source of the light to be extinguished automatically. The arrangement may also be made in such a way that the source is shielded off. In order to warn the operator an audible or optical signal may be put into action simultaneously. This makes it possible to carry out other operations during irradiation.

In connection with the great sensibility of the instruments which is usually required and the very small displacing forces involved preferably the well known regulating ray and chopper bar methods are made use of to initiate or establish contacts. When amplifiers are used, directly acting relays, preferably relay valves, may advantageously be employed.

Instead of a photo-electric cell and a relay circuit such as that illustrated, I may employ any other indicating device 48 (Figure 9) in combination with a light sensitive means; for example, the device 48 may be a galvanometer connected with a photo-electric cell so that energization of the cell results in a quick fluctuation of the pointer of the galvanometer. For convenience an acoustic signal device having the advantages described above is preferably used. In such a case the galvanometer of the previous example needs only be replaced by e. g. a loudspeaker with relay device (which is for example provided with a relay valve).

The methods of direct observation with the human eye on one hand and the electric ones on the other hand all have their particular advantages.

For the first mentioned methods devices of the simplest and cheapest construction may be used; the amount of radiation may be read on a scale; the electric methods permit to dose automatically, to actuate audible or optical signals and so on.

Figure 6 shows diagrammatically an arrangement which may be employed to dose radiation received by an object from the sun. In this figure lines $a$ represent the paths of radiations from the sun, 50 the object being treated, and 52 an indicating system which may correspond to any of the embodiments described in connection with Figures 1 to 5 inclusive, with the obvious exception of the embodiment for automatically extinguishing the light source, which may be substituted by means for shielding the object from the sun. The system 52 is positioned to receive radiations from a reflecting surface 54.

It should be apparent that the system 52 may be arranged between $a$ and the mirror 54.

The above description refers to the dosing of irradiation in a quantitative respect, but it is to be understood that this may also be done in a qualitative manner, that is, it may be effected in such a manner that the dosing or indicating means is affected practically exclusively and to a corresponding extent by the rays which bring about the effect in the object or system to be irradiated.

When, for example, in the system to be irradiated copying is done on a diazo layer which contains a certain diazo compound, the dosing device will preferably be provided with a layer containing the same or an analogous diazo compound. For that purpose a sheet of the same material, or the same sheet of material as that on which the copying is done may often be used advantageously. This may, for example, be practically carried out when the last mentioned material is transparent. For qualitative adjustment, however, it may also be advantageous to interpose between the source of radiation and the diazo layer of the dosing system a filter which mainly transmits only those rays which bring about the effect of the irradiation in the system to be irradiated, while the permeability for the different wave lengths may furthermore be adapted to the specific effects of the rays of those wave lengths. For instance, in dosing erytheme radiation a filter may be placed in front which chiefly transmits only this radiation. When a filter is placed in front, the filter indicated at 12 in the figures may sometimes be advantageously omitted, because in many instances the filter placed in front may be of such a nature that at the same time it only transmits a radiation suitable as a breaking through radiation, and in such a case the filter may of course, if such an arrangement does not prejudice a satisfactory qualitative dosage, be interposed as well between 2 and 10 as between 10 and 16, the arrangement shown in the figures.

The graduated light absorption member 20, which according to Figure 3 is interposed between 10 and 12, 16 may also be present between 12 and 16 or between 16 and e.

In case the filter 12, Figure 2, is interposed between 2 and 10 there may, consequently, be a direct contact between 10 and 16, (Figure 8) which enhances the sharpness of the observation. An arrangement having the filter 12 interposed between 2 and 10 offers also the advantage that when gauging a certain dose the intensity of light in the field of observation is greater.

In order to illustrate modes of application of my invention, there are described below several examples of practical operations in which it is employed.

Example I

For accurately dosing the quantity of radiation for example for a blue printing operation I may employ an arrangement such as that shown in Figure 1 in which the object 14 is a frame on which a copy on blueprinting paper is made, the metal sheets 4, 6 for example measuring 20 x 20 cm. and having a central opening of, for example, 2 cm. diameter. Part 10 of the said arrangement consists of a cellulose foil uniformly drenched with the sodium sulfonate of p-diazo-diethylaniline. The light filtering means 12 consists of two containers having parallel windows (the inner distance of the windows being 10 mm.) one of which contains a solution of 1.5% of iodine in carbon tetrachloride, and the other containing an ammoniacal solution of 10% copper sulfate ($CuSO_4.5H_2O$) in water.

When the arrangement has been completed and the system located at some distance from the light source 2, the latter is ignited. Through the openings in the metal sheets the source 2, viewed from e, cannot be seen, or only with a very feeble grayish red violet tinge. After a certain lapse of time, however, the opening suddenly transmits a blue violet light that reaches its maximum intensity within a few seconds. This breaking through of the light indicates the final moment of the irradiation period, and as soon as this moment has been ascertained the light source is switched off. Should it be found that the object has received an insufficient quantity of radiation, the distance between the indicating means and the light source is enlarged, or, if possible, the distance between the light source and the object is reduced or an absorbing means, such as a frosted glass screen or the like, may be placed between the source and the indicating means. Now the irradiation is repeated till the object has received the exact amount of radiation. As soon as the proper dose has been arrived at, the arrangement obtained is gauged once for all. In the same manner arrangements gauged for greater or smaller doses can be found.

The gauging may, of course, also be effected by varying the quantity of the diazo compound in means 10 and in quite a number of other ways.

The diazo sulphonate mentioned above may e. g. be replaced by the following diazo compounds: p-diazo-diphenylamine, p-diazo-o-chlorodimethylaniline or tetrazo-tolidine.

The eye e may also be replaced by a selenium barrier layer photo-electric cell which may be connected with a galvanometer the pointer of which quickly swings as soon as the final moment of the irradiation period has been attained. When the cell is connected with a cut-off relay, the source of radiation 2 is switched off as soon as the final moment of the irradiation period has been reached, so that an automatic dosing is obtained. The cell may also advantageously put into action an acoustic or optical signal.

Naturally the cell replacing e may advantageously be placed immediately behind member 16 instead of at some distance from it as indicated for e in Figure 2.

Example II

The procedure of this example in principle is the same as that of Example I. The light source 2 is a high pressure mercury vapor lamp made from glass that easily transmits ultra-violet light. 10 is a cellulose acetate foil saponified on one of its faces and prepared with p-diazo-dimethyl-m-toluidine. 12 is a filter of the type known to the art as a "Schott" filter and may be of the type designated "U. G. 2", of one millimeter thickness, or "U. G. 1", of two millimeter thickness. (Compare the catalogue of the firm of Schott & Gen., Jena). It is preferably located between source 2 and means 10, but of course may also be interposed between means 10 and member 16 (Fig. 2). The screen member 16 is a cellulose foil drenched with fluorescein, chinine sulfate or aesculin. If the filter 12 should be interposed between 2 and 10 the fluorescent substance may also be deposited on the side of the indicating means 10 facing the observer. The object 14 in this example represents a photographic frame on which a copy is to be made on a diazo type paper which has been prepared with a diazo compound having a tertiary amino group in the para place with respect to the diazo group.

After the light source 2 has been turned on, the opening in the metal plate 6 transmits a weak dark red light. The end of the dosing period is indicated by a suddenly appearing strong fluorescent light which may be green or blue depending on the particular fluorescent substance which has been used. Aside from the fluorescent substances mentioned above, I may also use others, such as, for example, uranyl sulfate in crystal form, kerosene, lubricating oil, a "Schott" filter, type "G. G. 12" and the like.

Example III

An arrangement according to Figure 2 may be provided, in which, however, members 10 and 12 are replaced by the system represented in Figure 3 and member 16 is located between member 12 and plate 6. The plate 6 instead of a round opening has a horizontal split of 5 mm. height and 50 mm. breadth. The graduated light absorbing members 18 and 20 are optical wedges, each having an optical density of, for example, 0.1 at one edge and 0.5 at the other. The wedge 18 is arranged with its smallest density at the right, and wedge 20 is oppositely disposed. In this example, the source 2 is an arc lamp for photoprinting, 10 is an acetyl cellulose foil saponified on one of its faces having a thickness of .05 millimeter and having been prepared with p-diazoethylbenzylaniline. The member 12 is a "Schott" filter U. G. 2 of one millimeter thickness. Screen 16 is a cellulose foil prepared with fluorescein and provided with a scale division that sub-divides the breadth of 50 mm. of the split of the metal plate 6 into ten equal parts. In the printing frame 14 a screen reflex copy is to be made by means of a covering screen; the light-sensitive compound is the same as that used in 10.

After the light source has been turned on the entire opening in the metal plate 6 transmits a uniform weak dark red light. After the lapse of a certain period of time, an intense green fluorescent light appears at the right side of the opening, and the boundary between this light and the original red slowly shifts to the left over the scale division. By determining the point on the scale division where the irradiation should be terminated a gauging is obtained which results in the production of a perfect reflex copy on the frame 14.

Assuming, for example, that this point occurs when the boundary between the red and green lights in the opening arrives at the seventh graduation line, exactly the same dosage is always obtained when subsequent irradiations are terminated at that line.

Among the many advantages of the arrangement of this example are the following:

1. It permits the measurement of varying amounts of radiation.
2. The approach of the moment at which the treatment should be terminated is observed a long time before it has arrived, whereas in the Examples I and II one is as it were surprised by the breaking through rays.

The use of the same foil for the copying operation in 14 and as the light sensitive material in the indicating means 10 results in very great advantages. Satisfactory reflex copies are always obtained automatically, once a definite gauging of the arrangement for making reflex copies in 14 has been ascertained; this is even the case if, for example, the foil used should have been prepared thicker or thinner than normally on account of a fault in its manufacture. For in instances in which the preparation is too thin a smaller amount of radiations must be applied and is automatically applied due to the shorter period of absorption of the radiations by the identically prepared foil 10.

Instead of employing the wedges 18 and 20 I may substitute an indicating foil 10 in which the diazo compound is distributed wedge-like. It is also possible to substitute said foil 10 by an indicating means 30, as shown in Figure 4, wherein a plurality, for example ten, of prepared foils are superimposed with overlapping portions to form a steplike structure. By the use of such a structure, a fluorescent area progressively extending step-wise from right to left is then observed through the opening in plate 6.

It is well known that the radiation of an arc lamp, especially during the first minute after it has been switched on, varies greatly. These fluctuations, however, exert no influence on the accuracy of the measurement. Even in instances when the lamp is switched off for an arbitrary period of time during treatment the same amount of radiation is measured, and with sufficient exactness for screen reflectography, which requires very precise dosing for proper results.

*Example IV*

An arrangement suited for operations with sunlight is prepared, as illustrated in Figure 6, so that sunlight arriving in the direction *a* is reflected by a mirror at 54 through the system 52. As a matter of fact system 52 may be substituted by the corresponding system used in Example III. The mode of operation may also be the same as that of Example III, with the exception, however, that of course *a* cannot be turned on. In order to obtain an exact dosing, the object at 50 and the system 52 are covered and they are simultaneously uncovered and covered at the beginning and at the end of the dosing.

When fixing the dose of radiation required it may turn out to be desirable to interpose intercepting layers, for example frosted glass screens, between *a* and 54.

Even when the solar irradiation is irregular a sharp dosing is obtained. For example, when the sunlight is temporarily screened off by passing clouds complete treatment of the object requires more time but the final point of treatment is nevertheless sharply ascertained as soon as the amount of radiation to which the arrangement has been gauged is received.

It is to be understood that also in the arrangement of Figure 6 a photo-cell may be used which is connected with a galvanometer, an acoustic signal, an optical signal, relay devices and so on.

From the foregoing description, it is apparent that my invention broadly comprehends the use of diazo compounds as defined before having the property of markedly absorbing rays of certain wave lengths and of thereafter suddenly transmitting the same.

The examples of diazo compounds given before are merely illustrative and I am by no means limited to these specific examples.

I wish it to be understood further that my invention is not limited to details of arrangement described hereinabove, but that it should be construed broadly within the spirit of the specification and the scope of the appended claims.

I claim:

1. In the treatment of an object by radiant energy, the method of measuring the quantity of irradiation which comprises simultaneously exposing to irradiation the object and a diazo compound having the property of markedly absorbing certain rays of said irradiation and after having been acted upon by a certain amount of radiation of suddenly transmitting the said rays, and correlating the end of the exposure of said object with the beginning of the transmission of the said rays.

2. In the use of radiations of light for photoprinting, bleaching, irradiation of foodstuffs, light therapy and the like, exposing the object undergoing treatment to the radiations simultaneously with the exposure of a diazo compound having the property of markedly absorbing certain rays in said radiations and after having been acted upon by a certain amount of radiation of suddenly transmitting such rays and correlating the end of the exposure of said object with the beginning of the transmission of the said rays, whereby the dose of radiation to which the object is exposed is accurately controlled.

3. The method of subjecting an object to controlled amounts of radiations which comprises simultaneously exposing to the radiations the object and a diazo compound having the property of markedly absorbing certain rays of said radiations and after having been acted upon by a certain amount of radiation of suddenly transmitting said rays, visually ascertaining the beginning of the transmission of the said rays and correlating the end of the exposure of said object with the said beginning.

4. The method of subjecting an object to controlled amounts of radiations which comprises simultaneously exposing to the radiations the object and a diazo compound having the property of markedly absorbing certain rays of said radiations and after having been acted upon by a certain amount of radiation of suddenly transmitting said rays, electrically ascertaining the beginning of the transmission of the said rays and correlating the end of the exposure of said object with the said beginning.

5. The method of subjecting an object to controlled amounts of radiations which comprises simultaneously exposing to the radiations the object and a diazo compound having the property of markedly absorbing certain rays of said radiations and after having been acted upon by a certain amount of radiation of suddenly transmitting said rays, electrically ascertaining the beginning of the transmission of the said rays and automatically terminating the exposure of the said object in correlation with the said beginning.

6. The method of subjecting an object to controlled amounts of radiations which comprises simultaneously exposing to the radiations the object and a diazo compound having the property of markedly absorbing certain rays of said radiations and after having been acted upon by a certain quantity of radiation of suddenly transmitting said rays, substantially filtering out such radiations which might interfere with a sharp ascertainment of the beginning of the transmission of the said rays and correlating the end of the exposure of the object with said beginning.

7. The method of subjecting an object to controlled amounts of radiations which comprises simultaneously exposing to the radiations the object and a diazo compound having the property of markedly absorbing from said radiations substantially only invisible rays and after having been acted upon by a certain amount of radiation of suddenly transmitting said rays, visibly indicating the presence of said rays after they have broken through the diazo compound and correlating the end of the exposure of the said object with the beginning of the transmission of the said rays.

8. The method of subjecting an object to controlled amounts of radiations which comprises simultaneously exposing to the radiations the object and a diazo compound having the property of markedly absorbing substantially only invisible rays and after having been acted upon by a certain amount of radiation of suddenly transmitting said rays, substantially filtering out such radiations which might interfere with a sharp ascertainment of the beginning of the transmission of the said rays, visibly indicating the presence of said rays after they have broken through the diazo compound and correlating the end of the exposure of the object with said beginning.

9. The method of subjecting an object to controlled amounts of radiations which comprises simultaneously exposing to the radiations the object and a layer containing a diazo compound having the property of markedly absorbing certain rays of said radiations and after having been acted upon by a certain amount of radiation of suddenly transmitting said rays, causing the said rays to break through the diazo compound in successive moments with respect to the various parts of the layer containing the diazo compound and with a graduated intensity and correlating the end of the exposure of the said object with the progressively extending transmission of the said rays.

10. The method of subjecting an object to controlled amounts of radiations which comprises simultaneously exposing to the radiations the object and a layer containing a diazo compound having the property of markedly absorbing certain rays of said radiations and after having been acted upon by a certain amount of radiation of suddenly transmitting said rays, causing the said rays to break through the diazo compound in successive moments with respect to the various parts of the layer containing the diazo compound and with a graduated intensity, neutralizing the graduated intensity of the radiation which has passed through the diazo compound and correlating the end of the exposure of the object with the progressively extending transmission of the said rays.

11. The method of subjecting an object to controlled amounts of radiations which comprises simultaneously exposing to the radiations the object and a layer containing a diazo compound having the property of markedly absorbing certain rays of said radiations and after having been acted upon by a certain amount of radiation of suddenly transmitting said rays, causing the said rays to break through the diazo compound in successive moments with respect to the various parts of the layer containing the diazo compound and correlating the end of the exposure of the said object with the progressively extending transmission of the said rays.

12. The method of subjecting an object to controlled amounts of radiations which comprises simultaneously exposing to the radiations the object and a diazo compound having the property of markedly absorbing certain rays of said radiations and after having been acted upon by a certain amount of radiation of suddenly transmitting said rays, the diazo compound being such that its spectral sensitiveness substantially corresponds to that of the said object, and correlating the end of the exposure of said object with the beginning of the said transmission.

13. The method of subjecting an object to controlled amounts of radiations which comprises simultaneously exposing to the radiations the object and a layer containing a diazo compound having the property of markedly absorbing certain rays of said radiations and after having been acted upon by a certain amount of radiation of suddenly transmitting said rays, preventing some radiations from arriving at the diazo layer so as to make the course of the decomposition of the diazo compound by the remaining radiations correspond to that of the reaction of the said object, and correlating the end of the exposure of said object with the beginning of the said transmission.

14. In combination, for directly measuring (dosing) irradiation, means in the field of irradiation from a source including a diazo compound having the property of markedly absorbing certain rays and after having been acted upon by a certain amount of radiation of suddenly transmitting said rays, means responsive to exposure to said certain rays for indicating the transmission of said rays by the diazo compound, and means between said indicating means and the source for substantially filtering out radiations of other wave lengths than those of the said certain rays.

15. In combination, for directly measuring (dosing) irradiation, means in the field of irradiation from a source including a diazo compound having the property of markedly absorbing certain rays and after having been acted upon by a certain amount of radiation of suddenly transmitting said rays, means responsive to exposure to said certain rays for indicating the transmission of said rays by the diazo compound, graduated light absorption means between said diazo compound and the source, and means between said indicating means and the source for substantially filtering out radiations of other wave lengths than those of the said certain rays.

16. In combination, for directly measuring (dosing) irradiation, means in the field of irradiation from a source including a diazo compound having the property of markedly absorbing certain rays and after having been acted upon by a certain amount of radiation of suddenly transmitting said rays, means responsive to exposure to said certain rays for indicating the transmission of said rays by the diazo compound, graduated light absorption means between said diazo compound and the source, graduated light absorption means between said diazo compound and said indicating means for neutralizing variations in intensity caused by the aforesaid graduated light absorption means, and means between said indicating means and the source for substantially filtering out radiations of other wave lengths than those of the said certain rays.

17. In combination, for directly measuring irradiation, means in the field of irradiation from a source including a diazo compound having the property of markedly absorbing certain rays and after having been acted upon by a certain amount of radiation of suddenly transmitting said rays, a fluorescent member responsive to exposure to said rays for indicating the transmission of said rays by the diazo compound, graduated light absorption means between the diazo compound and the source, and a scale in the field of rays transmitted by the diazo compound for gauging progressive transmission of said rays by the diazo compound.

18. In combination, for directly measuring (dosing) irradiation, means in the field of irradiation from a source including a diazo compound having the property of markedly absorbing certain rays and after having been acted upon by a certain amount of radiation of suddenly transmitting said rays, electrical means responsive to exposure to said certain rays for indicating the transmission of said rays by the diazo compound, and means between said electrical means and the source for substantially filtering out radiations of other wave lengths than those of the said certain rays.

19. In combination, for directly measuring (dosing) irradiation, means in the field of irradiation from a source including a diazo compound having the property of markedly absorbing certain rays and after having been acted upon by a certain amount of radiation of suddenly transmitting said rays, graduated light absorption means between said diazo compound and the source, and means for substantially filtering out radiations of other wave lengths than those of said certain rays.

LODEWIJK P. F. VAN DER GRINTEN.